Sept. 20, 1960  T. S. LOESER  2,952,871
FLOW PATH COMPENSATOR
Filed March 4, 1958
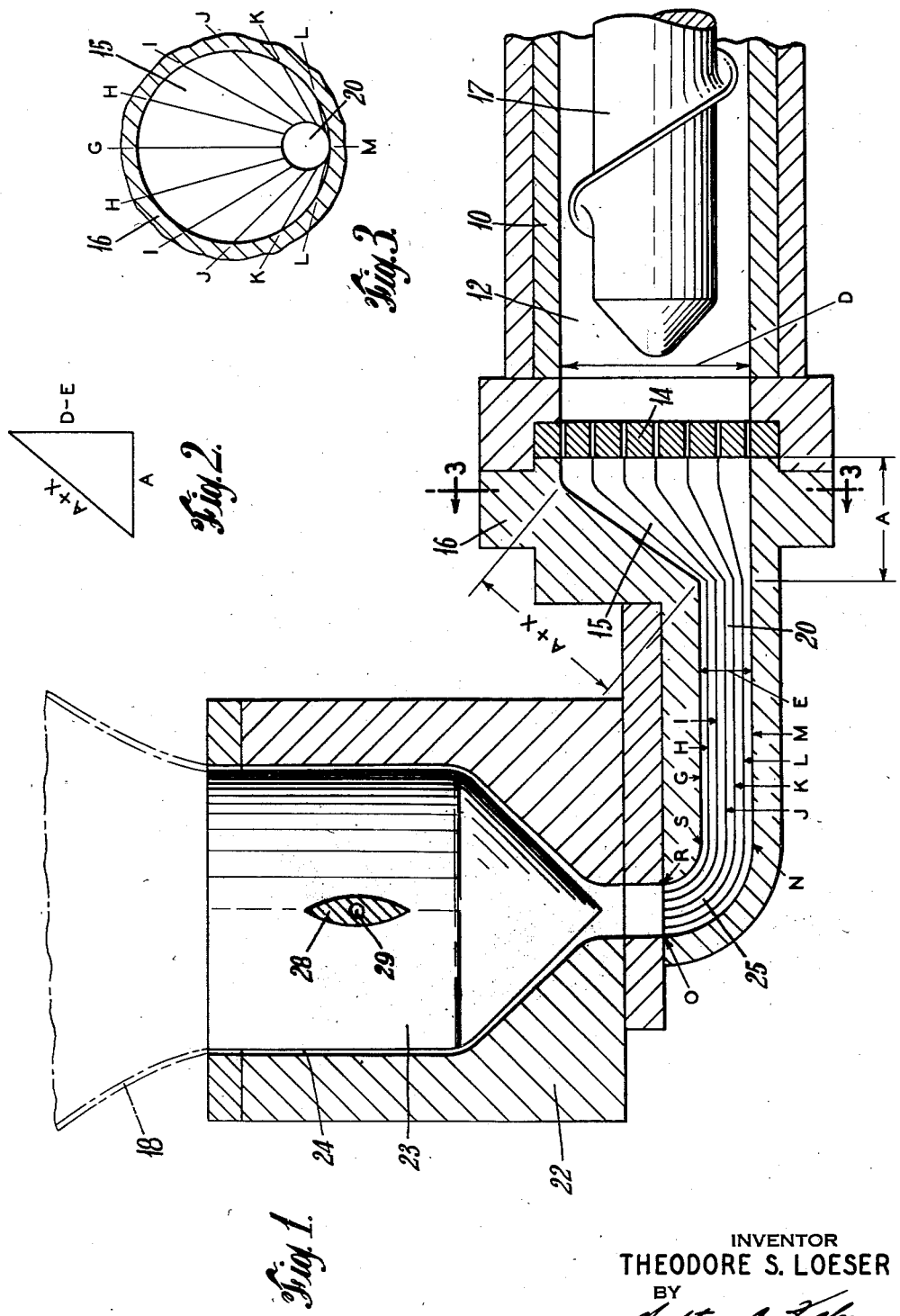
INVENTOR
THEODORE S. LOESER
BY
*Walter C. Kahm*
ATTORNEY

United States Patent Office 2,952,871
Patented Sept. 20, 1960

2,952,871

FLOW PATH COMPENSATOR

Theodore Salm Loeser, New Brunswick, N.J., assignor to Union Carbide Corporation, a corporation of New York Filed Mar. 4, 1958, Ser. No. 719,043

5 Claims. (Cl. 18—12)

This invention relates to extrusion apparatus and more particularly to apparatus for the extrusion of thermoplastic film.

The apparatus of my invention will be particularly described with reference to the extrusion of tubular polyethylene film but it is to be understood that the extrusion of other thermoplastic materials such as vinyl polymers and copolymers, isobutylene copolymers, polyesters, such as polyethylene glycol terephthalate, cellulose esters and the like can be extruded with the present apparatus. In addition, extruded articles other than tubular film can be made with the apparatus hereinbelow described.

It is well known to form a tubular film of a thermoplastic such as polyethylene by forcing the resin through a die having an annular orifice. The tube so extruded is cooled until it solidifies. The tube can be inflated prior to solidification to provide tubular film with a diameter greater than that of the annular orifice.

The annular orifice is formed between a die which is perforated with a conical hole terminating in a circular opening referred to as the die lip and a cylindrical or conical pin within the aperature which protrudes centrally through the hole in the die.

Tubular film made by this type of die ordinarily shows varying wall-thickness at points around the circumference of the tube. Such a variation is further intensified by inflating the tubular film while it is in a molten state because the thicker parts of the tube wall stretch more readily than the thinner parts thereof. This is due to the thin parts solidifying rapidly while the thick parts remain in a molten state. These variations in wall-thickness are undesirable because the bursting strength of a tubular film is no greater than that of the thinnest wall portion.

The variation in thickness of the tube walls can be caused by the die pin and die lip not being co-axial. Adjustable pins and lips are known but their adjustment is at best relatively coarse. In addition, the adjustment requires many trial runs which are expensive both in time and material consumed. The other principal cause of tube wall-thickness variation is a non-uniform supply of material at all points around the orifice. Because tubular film is of necessity extruded vertically and extruders for economic reasons are placed for horizontal extrusion the material from the extruder must undergo a 90° change in direction before leaving the die orifice. It is the directional change which causes non-uniformity in the flow of the extruded material around the die pin.

Heretofore a die having an inlet on the side rather than the bottom has been used. With this type of die the material surrounds the die pin completely before flowing through the die orifice. It is obvious that flow pressures on the inlet side of the die pin differ greatly from those on the opposite side of the die pin. The abrupt change in the direction of the material increases these pressure differences. Attempts to improve the operation of side inlet dies by use of an offset die pin and manifolds within the die have not provided the uniform and symmetrical flow to the die orifice without which tubular film of equal wall thickness cannot be obtained.

It is the main object of my invention therefore to provide a uniform and symmetrical flow of material to the die orifice whereby extruded thermoplastic articles having a uniform wall thickness are obtained.

This and other objects are accomplished according to my invention by placing between an extruder and the die a throat section having non-axial inlet and outlet openings.

An apparatus illustrative of the invention includes a conventional extruder, a die having an orifice at an angle to the direction of extrusion and a means for making the flow of material at the die-orifice uniform and symmetrical.

In the drawings:

Figure 1 is a transverse horizontal section of an apparatus forming one embodiment of the invention;

Figure 2 shows the trigonometric relation used to determine the shape of the flow-path compensator; and Figure 3 is a section taken along line 3—3 of Figure 1.

The extrusion apparatus shown in Figure 1 includes a heated extrusion cylinder 10 having a cylindrical bore 12 formed therein, and a stock screw 17 rotatably mounted therein which forces the thermoplastic material out through an extruder head 16. The extruder head 16 includes a throat section 15 which forms a continuation of the bore 12 and communicates with a conduit 20. A breaker plate 14 is positioned between the bore 12 and the throat section 15. Positioned at the exit end of conduit 20 is an elbow bend 25 of approximately 90°. Extruded material passing through conduit 20 is directed vertically upward by the elbow bend 25 into the bottom of a die 22 which cooperates with a die pin 23 to form an annular orifice 24 therewith through which the material passes. The die pin 23 is supported by streamlined wings 28 having an opening 29 into which air is forced to inflate the tube 18 formed by the material passing upwardly through the annular orifice 24. The tube is drawn upwardly by suitable means such as nip rolls, not shown in the drawings.

The throat section 15 is shaped to compensate for differences in flow path length between the breaker plate 14 and the die orifice 24 caused by the material undergoing a 90° change in direction at elbow bend 25. The flow distances along lines G, H, I, J, K, L and M are all equal, resulting in a uniform and symmetrical flow of molten material around the die pin 23. Cut along the plane 3—3 and as shown in Figure 3, the throat section 15 has a circular cross-section. The inlet opening of the throat section 15 has a diameter D of the abutting extruder bore 12. The opposite, or exit opening, of the throat section 15 has a diameter equal to the diameter E of the abutting conduit 20 and the elbow bend 25. The diameter E should be large enough to provide a cross-sectional area at least equal to the annular area of the die orifice to prevent any choking effect in the feed of material from the extruder to the die.

The amount of flow length compensation needed to assure uniform and symmetrical flow depends upon the degree of change in direction caused by the elbow bend 25. The difference in the distances N to O and R to S is proportional to the degree of bend in the elbow bend 25. The amount by which the former exceeds the latter can be represented by X. To determine the amount of compensation needed to make all flow-lengths G, H, etc. equal, the following formula which expresses the relation of the sides of the triangle in Figure 2 is employed:

$$(A+X)^2 = (D-E)^2 + A^2$$

wherein A is amount of flow compensation required; X is the difference in shortest and longest lengths in the elbow bend; D is the extruded bore diameter and is equal to the diameter of the throat section inlet; and E is the conduit diameter and is equal to the diameter of the throat section outlet.

Solution of the formula above for A fixes the shape of the throat section or flow-path compensator. By using ordinary care in measurement the flow-path distances between the extruder and the die can be made equal in length within 1-2%.

Generally the extruder head, flow-path compensator, conduit and die orifice have a circular cross-section and the calculation by the formula above will insure the equivalency of all flow-path lengths. Cross-sections other than circular, such as elliptical or polygonal can be used in the above-mentioned extruding system components but more complex calculation and increased cost of construction necessitated by such shapes precludes their use in most applications.

The processing and end-product quality advantages made possible by the use of my flow-path compensator are illustrated by the following example:

An apparatus including 1½" double extra strong tube turn elbow of 90° with an internal diameter of 0.896" was used. The conduit also had an internal diameter of 0.896". The compensator entrance had an internal diameter of 2½" and the internal diameter of the exit was 0.896" corresponding to that of the conduit and elbow. The length of the compensator was 2½".

A commercially available low density polyethylene was extruded from a 2½" extruder through the above-described flow-path compensator, which had been constructed according to the above formula, into a 6 inch bottom fed vertically extruding tubular film die. The rate of extrusion at a pressure of 4000 p.s.i. was 50 lgs./hr. with a screw speed of 76 r.p.m. The barrel temperature was 170° C., the screw temperature 50° C. and the material temperature 165° C. Film was drawn from the die at 30 ft./min. The die lip and die pin temperature was 160° C.

The film produced had a thickness of .0150±.0001". In the production of 1¼-1½ mil film variations of ±.00005" can be obtained. A well adjusted die pin in a side-fed tubular film die produces film having no better than a 0.003" variation in wall thickness. In addition to providing highest quality tubular film with negligible wall-thickness variation, my apparatus provides significant processing advantages. In producing such high quality film using an extruder with a properly constructed flow-path compensator there is no delay encountered such as occurs in using a side-fed die. The latter requires numerous sample runs before the adjustable die pin or die lip is properly positioned for the production of satisfactory film.

What is claimed is:

1. In an apparatus for the production of extruded articles comprising an extruder and a die and therebetween an elbow bend which causes unequal flow of material to the die due to varying flow distances within the bend, the improvement which comprises a flow-path compensator for equalizing all flow distances between the extruder and said die, said flow-path compensator comprising a throat section mounted between said extruder and said die having an eccentrically positioned outlet with respect to the inlet thereof, the degree of eccentricity being such that plastic material passing from said inlet to said outlet is caused to traverse flow path distances of unequal length and is distorted, said distortion being equal and opposite to the distortion in flow of material caused by the varying flow distances within said elbow bend, whereby all material reaching said die traverses an equal flow distance from extruder to die.

2. In an apparatus for the production of film comprising an extruder and a film-forming die and therebetween an elbow bend which causes unequal flow of material to the said die due to varying flow distances within the bend, the improvement which comprises a flow-path compensator for equalizing all flow distances between the extruder and said film-forming die, said flow-path compensator comprising a throat section mounted between said extruder and said film-forming die having an eccentrically positioned outlet, with respect to the inlet thereof, the degree of eccentricity being such that plastic material passing from said inlet to said outlet is caused to traverse flow path distances of unequal length and is distorted, said distortion being equal and opposite to the distortion in flow of material caused by the varying flow distances within said elbow bend, whereby all material reaching said die traverses an equal flow distance from extruder to die.

3. In an apparatus for the production of tubular film, comprising an extruder and a tube-forming die and an elbow bend therebetween which causes unequal flow of material to the die due to varying flow distances around the bend, the improvement which comprises a flow path compensator for equalizing all flow distances from the extruder to the die said flow-path compensator comprising a throat section mounted between said extruder and said tube-forming die having an eccentrically positioned outlet with respect to the inlet thereof, the degree of eccentricity being such that plastic material passing from said inlet to said outlet is caused to traverse flow path distances of unequal length and is distorted, said distortion being equal and opposite to the distortion in flow of material caused by the varying flow distances within said elbow bend, whereby all material reaching said die traverses an equal flow distance from extruder to die.

4. Apparatus for producing equi-distant flow paths of plastic material from an extruder to a point immediately adjacent a die orifice, the longitudinal axis of said die orifice being angularly displaced with respect to the longitudinal axis of said extruder, which comprises a throat section having an outlet eccentrically mounted with reference to the inlet thereof, whereby plastic material passing from said inlet to said outlet is caused to traverse flow path distances of unequal length and is distorted, said distortion being equal and opposite to the distortion caused by the angular displacement of the longitudinal axis of said die orifice with respect to the longitudinal axis of said extruder.

5. In an apparatus for extruding plastic material, the combination of an extruder and a die having the longitudinal axis of its orifice at an angle with respect to the longitudinal axis of said extruder, with compensating means to provide a uniform rate of flow of said material across the entire cross-sectional area of the flow path at a point immediately adjacent the die orifice, said means comprising a throat section having an outlet eccentrically mounted with reference to the inlet thereof, whereby plastic material passing from said inlet to said outlet is caused to traverse flow path distances of unequal length and is distorted, said distortion being equal and opposite to the distortion caused by the angular displacement of the longitudinal axis of said die orifice with respect to the longitudinal axis of said extruder.

References Cited in the file of this patent

UNITED STATES PATENTS

| | | |
|---|---|---|
| 2,560,778 | Richardson et al. | July 17, 1951 |
| 2,597,553 | Weber | May 20, 1952 |

FOREIGN PATENTS

| | | |
|---|---|---|
| 1,126,621 | France | July 30, 1956 |
| 940,971 | Germany | Mar. 29, 1956 |
| 624,699 | Great Britain | June 15, 1949 |